US006887834B2

(12) United States Patent
Nguyen et al.

(10) Patent No.: US 6,887,834 B2
(45) Date of Patent: May 3, 2005

(54) METHODS AND COMPOSITIONS FOR CONSOLIDATING PROPPANT IN SUBTERRANEAN FRACTURES

(75) Inventors: Philip D. Nguyen, Duncan, OK (US); Johnny A. Barton, Marlow, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 337 days.

(21) Appl. No.: 10/235,352

(22) Filed: Sep. 5, 2002

(65) Prior Publication Data

US 2004/0048752 A1 Mar. 11, 2004

(51) Int. Cl.$^7$ .............................. C09K 3/00; E21B 43/26
(52) U.S. Cl. ...................... 507/221; 507/234; 507/263; 507/922; 507/924; 166/308.2; 166/280.2
(58) Field of Search ................................ 507/221, 234, 507/263, 922, 924; 166/308.2, 280.2

(56) References Cited

U.S. PATENT DOCUMENTS

| | | | |
|---|---|---|---|
| 3,492,147 A | | 1/1970 | Young et al. ............... 117/62.2 |
| 4,694,905 A | | 9/1987 | Armbruster ................. 166/280 |
| 4,785,884 A | | 11/1988 | Armbruster ................. 166/280 |
| 5,330,005 A | | 7/1994 | Card et al. .................. 166/280 |
| 5,439,055 A | | 8/1995 | Card et al. .................. 166/280 |
| 5,551,514 A | | 9/1996 | Nelson et al. ............... 166/280 |
| 5,604,184 A | | 2/1997 | Ellis et al. .................. 507/117 |
| 5,921,317 A | * | 7/1999 | Dewprashad et al. .... 166/280.1 |
| 5,924,488 A | * | 7/1999 | Nguyen et al. ........... 166/280.1 |
| RE36,466 E | | 12/1999 | Nelson et al. ............... 166/280 |
| 6,155,348 A | * | 12/2000 | Todd ......................... 166/280.2 |
| 6,311,773 B1 | * | 11/2001 | Todd et al. ................ 166/280.2 |
| 6,582,819 B2 | * | 6/2003 | McDaniel et al. ........... 428/402 |
| 6,776,236 B1 | * | 8/2004 | Nguyen ...................... 166/279 |
| 2002/0048676 A1 | * | 4/2002 | McDaniel et al. .......... 428/404 |

FOREIGN PATENT DOCUMENTS

| | | | |
|---|---|---|---|
| EP | 0 864 726 A2 | 9/1998 | ........... E21B/43/26 |
| EP | 1 130 215 A2 | 5/2001 | ........... E21B/43/26 |
| EP | 1 326 003 A1 | 7/2003 | ......... E21B/43/267 |
| EP | 1 394 355 A1 | 3/2004 | ......... E21B/43/267 |

OTHER PUBLICATIONS

Foreign Search Report, Jul. 21, 2004.

\* cited by examiner

Primary Examiner—Philip C. Tucker
(74) Attorney, Agent, or Firm—Robert A. Kent; C. Clark Dougherty, Jr.

(57) ABSTRACT

Improved methods and compositions for consolidating proppant in subterranean fractures are provided. In accordance with a method of the invention, proppant particles coated with a furfuryl alcohol resin composition are mixed with a gelled liquid fracturing fluid and the fracturing fluid is pumped into a subterranean zone. The fracturing fluid forms one or more fractures in the subterranean zone and deposits the proppant particles coated with the resin composition therein. Thereafter, the hardenable resin composition on the proppant particles is allowed to harden by heat and consolidate the proppant particles into chemical and thermal degradation resistant permeable packs.

32 Claims, No Drawings

METHODS AND COMPOSITIONS FOR CONSOLIDATING PROPPANT IN SUBTERRANEAN FRACTURES

BACKGROUND OF THE INVENTION

1. Field of the Invention

The present invention relates to methods of forming one or more fractures in a high temperature subterranean zone and consolidating proppant particles therein.

2. Description of the Prior Art

Hydrocarbon producing wells are often stimulated by hydraulic fracturing treatments. In hydraulic fracturing, a viscous fracturing fluid which also functions as a carrier fluid is pumped into a subterranean zone to be fractured at a rate and pressure such that one or more fractures are formed in the zone. Proppant particles, e.g., graded sand, for propping the fractures open are suspended in the fracturing fluid so that the proppant particles are deposited in the fractures when the fracturing fluid is broken. That is, a viscosity breaker is included in the fracturing fluid whereby the fracturing fluid reverts to a thin fluid which is returned to the surface. The proppant particles deposited in the fractures function to prevent the fractures from closing so that conductive channels are formed through which produced hydrocarbons can readily flow.

In order to prevent the subsequent flow-back of the proppant particles as well as loose or incompetent fines with fluids produced from the subterranean zone, the proppant particles have heretofore been coated with a hardenable resin composition which is caused to harden and consolidate the proppant particles in the zone. However, when the subterranean zone has a temperature above about 375° F., the hardened resin composition and the permeable proppant particle packs consolidated therewith rapidly deteriorate which allows proppant particles and formation fines to flow-back with produced formation fluids. The flow-back of the proppant particles and formation fines is very detrimental in that it erodes metal goods, plugs piping and vessels and causes damage to valves, instruments and other production equipment.

Another problem encountered in the use of prior hardenable resin compositions for coating proppant particles is that the hardenable resin composition or components thereof have had short shelf lives. In addition, the hardenable resin composition components have heretofore had low flash points, i.e., flash points of about 60° F. or below, making them very dangerous to use. Also, when the prior hardenable resin compositions or components thereof have been stored at high ambient temperatures, the compositions or components have quickly hardened making them unsuitable for use.

Thus, there are needs for improved methods of consolidating proppant particles in subterranean fractures whereby the permeable packs of consolidated proppant particles formed are chemical and thermal degradation resistant at high temperatures, i.e., temperatures above about 375° F. Further, there are needs for improved hardenable resin compositions and/or the components thereof that have long shelf lives and high flash points.

SUMMARY OF THE INVENTION

The present invention provides improved methods and compositions for consolidating proppant in fractures formed in high temperature subterranean zones which meet the needs described above and overcome the deficiencies of the prior art. The hardenable resin compositions of this invention are hardened by heat and consolidate resin coated proppant particles at temperatures above about 200° F. into chemical and thermal degradation resistant permeable packs which do not allow proppant flow-back and the production of formation fines with formation fluids.

An improved method of the present invention for forming one or more fractures in a subterranean zone having a temperature above about 200° F. penetrated by a well bore and consolidating proppant particles therein is comprised of the following steps. Proppant particles coated with a hardenable resin composition are provided. The hardenable resin composition is comprised of furfuryl alcohol resin, furfuryl alcohol, a solvent for the resin, a silane coupling agent, optionally, a hydrolyzable ester for breaking gelled fracturing fluid films on the proppant particles, and a surfactant for facilitating the coating of the resin on the proppant particles and for causing the resin to flow to the contact points between adjacent coated proppant particles. A gelled liquid fracturing fluid is also provided which is pumped into the subterranean zone to form one or more fractures and to deposit the proppant particles therein. The proppant particles coated with the hardenable resin composition are mixed with the fracturing fluid being pumped whereby the proppant particles coated with the hardenable resin composition are suspended therein. When the proppant particles coated with the hardenable resin composition have been deposited in the one or more fractures formed, the pumping of the fracturing fluid and the mixing of the proppant particles coated with the hardenable resin composition with the fracturing fluid are terminated. Thereafter, the hardenable resin composition on the resin composition coated proppant particles is allowed to harden by heat and consolidate the proppant particles into one or more chemical and thermal degradation resistant permeable packs.

Another improved method of this invention for forming one or more fractures in a subterranean zone penetrated by a well bore and consolidating proppant particles therein, the subterranean zone having a temperature above about 200° F. is comprised of the following steps. A liquid hardenable resin composition is provided comprised of furfuryl alcohol resin, furfuryl alcohol, an ethylene glycol butyl ether solvent for the resin, an n-beta-(aminoethyl)-gamma-aminopropyltrimethoxysilane coupling agent, optionally, a mixture of dimethylglutarate, dimethyladipate and dimethylsuccinate esters and a $C_{12}$–$C_{22}$ alkyl phosphate surfactant. A source of dry proppant particles and a gelled liquid fracturing fluid comprised of water and a gelling agent selected from the group consisting of guar gum, guar gum derivatives and cellulose derivatives are also provided. The gelled liquid fracturing fluid is pumped into the subterranean zone to form the one or more fractures therein and to place the proppant particles therein. The hardenable resin composition is coated onto the dry proppant particles conveyed from the source thereof to form hardenable resin composition coated proppant particles. The hardenable resin composition coated proppant particles are mixed with the fracturing fluid pumped into the subterranean zone whereby the hardenable resin composition coated proppant particles are suspended therein. When the hardenable resin composition coated proppant particles have been placed in the one or more fractures formed in the subterranean zone, the pumping of the gelled fracturing fluid, the coating of the hardenable resin composition onto the dry proppant particles and the mixing of the hardenable resin composition coated proppant particles formed with the fracturing fluid are terminated. Thereafter, the hardenable resin composition on the hardenable resin composition coated proppant particles is allowed to harden by heat and consolidate the proppant particles into one or more chemical and thermal degradation resistant permeable packs.

The objects, features and advantages of the present invention will be readily apparent to those skilled in the art upon a reading of the description of preferred embodiments which follows.

DESCRIPTION OF PREFERRED EMBODIMENTS

The present invention provides improved methods of forming one or more fractures in a subterranean zone penetrated by a well bore and consolidating proppant particles therein, the subterranean zone having a temperature above about 200° F. comprising the following steps. Proppant particles coated with a hardenable resin composition comprised of furfuryl alcohol resin, furfuryl alcohol, a solvent for the resin, a silane coupling agent, optionally, a hydrolyzable ester for breaking gelled fracturing fluid films on the proppant particles and a surfactant for facilitating the coating of the resin on the proppant particles and for causing the resin to flow to the contact points between adjacent resin coated proppant particles are provided. A gelled liquid fracturing fluid is also provided. The gelled liquid fracturing fluid is pumped into the subterranean zone to form the one or more fractures and to deposit the proppant particles therein. The proppant particles coated with the hardenable resin composition are mixed with the fracturing fluid pumped into the subterranean zone whereby the proppant particles coated with the hardenable resin composition are suspended therein. When the proppant particles coated with the hardenable resin composition have been deposited in the one or more fractures, the pumping of the gelled liquid fracturing fluid and the mixing of the proppant particles coated with the hardenable resin composition with the fracturing fluid are terminated. Thereafter, the hardenable resin composition on the resin composition coated proppant particles are allowed to harden by heat and consolidate the proppant particles into one or more chemical and thermal degradation resistant permeable packs.

The proppant particles utilized in accordance with the present invention are generally of a size such that formation particulate solids that migrate with produced fluids are prevented from being produced from the subterranean zone. Various kinds of proppant particles can be utilized including graded sand, bauxite, ceramic materials, glass materials, walnut hulls, polymer beads and the like. Generally, the proppant particles have a size in the range of from about 2 to about 400 mesh, U.S. Sieve Series. The preferred proppant is graded sand having a particle size in the range of from about 10 to about 70 mesh, U.S. Sieve Series. Preferred sand particle size distribution ranges are one or more of 10–20 mesh, 20–40 mesh, 40–60 mesh or 50–70 mesh, depending on the particular size and distribution of formation solids to be screened out by the consolidated proppant particles.

Furfuryl alcohol resins are readily available from a number of commercial sources. For example, suitable furfuryl alcohol resin is commercially available from Durez Corporation under the trade designation "Durez 33682™". Upon curing by heat in a subterranean zone, the furfuryl alcohol resin forms an insoluble mass that is highly resistant to chemical attack and thermal degradation, i.e., the cured resin resists thermal degradation at temperatures up to 700° F. The furfuryl alcohol resin is generally present in the hardenable resin composition in an amount in the range of from about 40% to about 75% by weight of the composition and more preferably in an amount of from about 55% to about 65%.

The furfuryl alcohol is generally present in the hardenable resin composition in an amount in the range of from about 1% to about 20% by weight of the composition and more preferably in an amount of from about 5% to about 15%.

Examples of solvents for the furfuryl alcohol resin which have flash points above about 125° F. and can be utilized include, but are not limited to, dipropylene glycol methyl ether, dipropylene glycol dimethyl ether, diethyleneglycol methyl ether, ethyleneglycol butyl ether, diethyleneglycol butyl ether, dimethyl formamide, propylene carbonate, butyl acetate, furfuryl acetate, d'limonene and fatty acid methyl esters. Of these, ethyleneglycol butyl ether is preferred. The solvent is included in the hardenable resin composition in an amount in the range of from about 10% to about 40% and more preferably in an amount of about 15% to about 30%.

Examples of silane coupling agents which can be utilized in the hardenable resin composition include, but are not limited to, N-2-(aminoethyl)- 3-aminopropyl-trimethoxysilane, 3-glycidoxypropyltrimethoxysilane and n-beta-(aminoethyl)-gamma-aminopropyltrimethoxysilane. Of these, n-beta-(aminoethyl)-gamma-aminopropyltrimethoxysilane is preferred. The silane coupling agent is included in the hardenable resin composition in an amount in the range of from about 0.1% to about 3% by weight of the composition and more preferably in an amount of from about 0.5% to about 2%.

Examples of hydrolyzable esters which can optionally be included in the hardenable resin composition include, but are not limited to, a mixture of dimethylglutarate, dimethyladipate and dimethylsuccinate, sorbitol, catechol, dimethylthiolate, methyl salicylate, dimethylsuccinate and terbutylhydroperoxide. Of these, a mixture of dimethylglutarate, dimethyladipate and dimethylsuccinate are preferred. The hydrolyzable ester is included in the liquid hardenable resin composition in an amount in the range of from about 0% to about 3% by weight of the composition and more preferably in an amount of about 1.5%.

Encapsulated sodium bisulfate can optionally be used as a substitute for the hydrolyzable esters. Encapsulated sodium bisulfate in the amount ranging from 1% to 15% by weight of the resin composition is admixed with the proppant slurry during coating of resin mixture onto the proppant. The sodium bisulfate must be encapsulated to minimize its release and interaction with the gelled liquid fracturing fluid during pumping of the fracturing fluid and proppant into the subterranean zone. Without encapsulation, the sodium bisulfate prematurely breaks down the fracturing fluid and causes the proppant to settle which is undesirable during the fracturing treatment.

Surfactants for facilitating the coating of the resin on the proppant particles and for causing the resin to flow to the contact points between adjacent resin coated proppant particles utilized in the hardenable resin composition include, but are not limited to, ethoxylated nonyl phenol phosphate ester surfactants, mixtures of one or more cationic surfactants and one or more non-ionic surfactants and a $C_{12}$–$C_{22}$ alkyl phosphonate surfactant. Of these, a $C_{12}$–$C_{22}$ alkyl phosphonate surfactant is preferred. The surfactant or surfactants utilized are included in the hardenable resin composition in an amount in the range of from about 1% to about 15% by weight of the composition and more preferably in an amount of about 5% to about 10%.

Another improved method of forming one or more fractures in a subterranean zone penetrated by a well bore and consolidating proppant particles therein, the subterranean zone having a temperature above about 200° F. is comprised of the following steps. A liquid hardenable resin composition is provided comprised of furfuryl alcohol resin, furfuryl alcohol, an ethylene glycol butyl ether solvent for the resin, an n-beta-(aminoethyl)-gamma-aminopropyltrimethoxysilane coupling agent, optionally, a mixture of dimethylglutarate, dimethyladipate and dimethylsuccinate, esters and a $C_{12}$–$C_{22}$ alkyl phosphate surfactant. A source of dry proppant particles and a gelled liquid fracturing fluid are also provided. The gelled liquid fracturing fluid is comprised of water and a gelling agent selected from the group consisting of guar gum, guar gum derivatives and cellulose derivatives. The gelled liquid fracturing fluid is pumped into the subterranean formation to form the one or more fractures therein and to place the proppant particles therein. The hardenable resin composition is coated onto the dry proppant particles conveyed from the source thereof to form hardenable resin composition coated proppant particles. The hardenable resin composition coated proppant particles are mixed with the fracturing fluid being pumped whereby the hardenable resin composition coated proppant particles are suspended therein. When the hardenable resin composition coated proppant particles have been placed in the one or more fractures by the fracturing fluid, the pumping of the fracturing fluid, the coating of the hardenable resin composition onto the dry proppant particles and the mixing of the hardenable resin composition coated proppant particles formed with the fracturing fluid are terminated. Thereafter, the hardenable resin composition on the hardenable resin composition coated proppant particles is allowed to harden by heat and consolidate the proppant particles into one or more chemical and thermal degradation resistant permeable packs.

The furfuryl alcohol resin, the furfuryl alcohol, the solvent, the silane coupling agent, the hydrolyzable ester mixture, and the surfactant that make up the liquid hardenable resin composition are present in the composition in the same amounts as described above.

The water in the gelled liquid fracturing fluid is selected from the group consisting of fresh water and salt water. The term "salt water" is used herein to mean unsaturated salt solutions and saturated salt solutions including brines and seawater.

The gelling agent in the fracturing fluid is generally present in an amount in the range of from about 0.1% to about 2% by weight of water therein and more preferably in an amount of about 0.2% to about 1%.

The gelled liquid fracturing fluid can include a cross-linking agent for increasing the viscosity of the fracturing fluid. Examples of suitable cross-linking agents include, but are not limited to, alkali metal borates, borax, boric acid and compounds capable of releasing multivalent metal ions in aqueous solutions. When used, the cross-linking agent is included in the fracturing fluid in an amount in the range of from about 0.01% to about 2% by weight of water therein and more preferably in an amount of about 0.1% to about 1%.

The fracturing fluid generally also includes a delayed viscosity breaker which functions to reduce the viscosity of the fracturing fluid and cause the resin composition coated proppant particles suspended in the fracturing fluid to be deposited in the fractures. Examples of delayed viscosity breakers which can be utilized include, but are not limited to, alkali metal and ammonium persulfates which are delayed by being encapsulated in a material which slowly releases the breaker, alkali metal chlorites, alkali metal hypochlorites and calcium hypochlorite. When used, the delayed viscosity breaker is included in the fracturing fluid in an amount in the range of from about 1% to about 5% by weight of water therein.

The hardenable resin composition of this invention for coating proppant particles and which hardens by heat is basically comprised of a furfuryl alcohol resin, furfuryl alcohol, a solvent for the resin having a flash point above about 125° F., a silane coupling agent, optionally, a hydrolyzable ester for breaking gelled fracturing fluid films and a surfactant for facilitating the coating of the hardenable resin composition on the proppant particles and for causing the hardenable resin composition to flow to the contact points between adjacent resin coated proppant particles.

The furfuryl alcohol resin, the furfuryl alcohol, the solvent, the silane coupling agent, the hydrolyzable ester and the surfactant are as described above in connection with the methods of this invention and are present in the hardenable resin composition in the amounts set forth above.

The hardenable resin composition of this invention can be stored at high ambient temperatures for long periods of time without hardening or otherwise deteriorating.

An improved method of this invention for forming one or more fractures in a subterranean zone penetrated by a well bore and consolidating proppant particles therein, the subterranean zone having a temperature above about 200° F. is comprised of the steps of: (a) providing proppant particles coated with a hardenable resin composition comprised of furfuryl alcohol resin, furfuryl alcohol, a solvent for the resin, a silane coupling agent and a surfactant for facilitating the coating of the resin on the proppant particles and for causing the resin to flow to the contact points between adjacent resin coated proppant particles; (b) providing a gelled liquid fracturing fluid; (c) pumping the gelled liquid fracturing fluid into the subterranean zone to form the one or more fractures and to deposit the proppant particles therein; (d) mixing the proppant particles coated with the hardenable resin composition with the fracturing fluid pumped in accordance with step (c) whereby the proppant particles coated with the hardenable resin composition are suspended therein; (e) terminating steps (c) and (d) when the proppant particles coated with the hardenable resin composition have been deposited in the one or more fractures; and; (f) allowing the hardenable resin composition on the resin composition coated proppant particles to harden by heat and consolidate the proppant particles into one or more chemical and thermal degradation resistant permeable packs.

Another improved method of the present invention for forming one or more fractures in a subterranean zone penetrated by a well bore and consolidating proppant particles therein, the subterranean zone having a temperature above about 200° F. is comprised of the steps of: (a) providing a liquid hardenable resin composition comprised of furfuryl alcohol resin, furfuryl alcohol, an ethylene glycol butyl ether solvent for the resin having a flash point above about 125° F., an n-beta-(aminoethyl)-gamma-aminopropyltrimethoxysilane coupling agent and a $C_{12}$–$C_{22}$ alkyl phosphate surfactant; (b) providing a source of dry proppant particles; (c) providing a gelled liquid fracturing fluid comprised of water and a gelling agent selected from the group consisting of guar gum, guar gum derivatives and cellulose derivatives; (d) pumping the gelled liquid fracturing fluid into the subterranean zone to form the one or more fractures therein and to place the proppant particles therein; (e) coating the hardenable resin composition onto the dry proppant particles conveyed from the source thereof to form hardenable resin composition coated proppant particles; (f) mixing the hardenable resin composition coated proppant particles formed in step (e) with the fracturing fluid pumped in accordance with step (d) whereby the hardenable resin composition coated proppant particles are suspended therein; (g) terminating steps (d), (e) and (f) when the hardenable resin composition coated proppant particles have been placed in the one or more fractures; and (h) allowing the hardenable resin composition on the hardenable resin composition coated proppant particles to harden by heat and consolidate the proppant particles into one or more chemical and thermal degradation resistant permeable packs.

A hardenable resin composition of this invention for coating proppant particles comprises: a hardenable resin comprised of furfuryl alcohol resin; furfuryl alcohol; a solvent for the resin having a flash point above about 125° F.; a silane coupling agent; and a surfactant for facilitating the coating of the hardenable resin composition on the proppant particles and for causing the hardenable resin composition to flow to the contact points between adjacent resin coated proppant particles.

In order to further illustrate the methods and compositions of this invention, the following examples are given.

EXAMPLE 1
Effect of Time and Temperature on Viscosity of Mixed Resin

Furfuryl alcohol resin ("Durez 33682™") obtained from the Durez Corporation was mixed with 1% of a silane coupling agent and 5% of an alkyl phosphate surfactant by weight of the furfuryl alcohol resin. The viscosity of the resin mixture was monitored with time at room temperature and at 120° F. in an oven, using a Brookfield DV-II viscometer and spindle No. 3. The temperature of 120° F. was selected to simulate the storage temperature in a warehouse during the summer months. Table I shows the recorded viscosities of the resin mixtures at different time periods. The results indicate that the viscosities of the resin mixtures remained substantially unchanged with time, even at higher temperature.

TABLE I

| Days | Viscosity (cp) of Resin Mixture Measured at Room Temperature | Viscosity (cp) of Resin Mixture Measured at 120° F. |
| --- | --- | --- |
| 0 | 1395 | — |
| 4 | 2765 | — |
| 5 | 2586 | — |
| 13 | 2982 | — |
| 18 | 2675 | 448 |
| 19 | 2555 | 576 |
| 21 | 2406 | 640 |
| 26 | 2624 | 717 |
| 32 | 2701 | 666 |
| 55 | 2995 | 730 |
| 90 | 2675 | 680 |

EXAMPLE 2
Consolidation Testing—Effect of Cure Time and Temperature 300 grams of 20/40-mesh bauxite proppant were dry coated with 9.0 mL of the resin mixture (3% by weight of proppant) before mixing in 360 mL of 35 lbs/Mgal carboxymethylhydroxypropyl guar based fracturing fluid. The resin coated proppant slurry then placed in a heat bath to bring the slurry temperature to 180° F. While 0.72 mL of an oxidizer breaker (2 gal/Mgal) and 0.126 mL of zirconium cross-linker (0.35 gal/Mgal) was added to the slurry. The content was stirred continuously at 180° F. one hour to simulate the effect of pumping. The slurry was then packed into brass chambers. The proppant packs were cured in an oven at different cure periods ranging from 3 hours to 7 days and at temperatures ranging from 250° F. to 350° F. without applying closure stress on the proppant packs. After each curing duration, the brass chambers containing the proppant packs were removed from the oven and allowed to cool down to room temperature. Cores were obtained from the consolidated proppant packs for unconfined compressive strength (UCS) measurements at room temperature. Table II shows the UCS values of the consolidated proppant cores. The results indicate that the unconfined compressive strengths of the proppant packs increases with cure time and begins to level off after 24 hour cure times. The mixed resin in the Series II testing contained encapsulated sodium bisulfate.

TABLE II

| Cure Temperatures | UCS (psi) Measured at Room Temperature After Various Curing Periods | | | | | | |
| --- | --- | --- | --- | --- | --- | --- | --- |
| | 3 hrs | 4 hrs | 5 hrs | 6 hrs | 24 hrs | 48 hrs | 7 days |
| Series I | | | | | | | |
| 300° F. | — | — | — | — | 89 | 487 | 1298 |
| 325° F. | 19 | 58 | 214 | 428 | 1306 | — | 1593 |
| 350° F. | — | — | — | 106 | 1052 | 1223 | 1740 |
| Series II | | | | | | | |
| 275° F. | NA | — | — | — | 145 | — | — |
| 300° F. | NA | — | — | 25 | 274 | 422 | 1003 |
| 325° F. | 80 | — | — | 361 | 1261 | 1561 | 1642 |
| 350° F. | 146 | — | — | 817 | 1313 | — | 1624 |

Thus, the present invention is well adapted to attain the objects and advantages mentioned as well as those which are inherent therein. While numerous changes may be made by those skilled in the art, such changes are encompassed within the spirit of this invention as defined by the appended claims.

What is claimed is:

1. An improved method of forming one or more fractures in a subterranean zone penetrated by a well bore and consolidating proppant particles therein, the subterranean zone having a temperature above about 200° F. comprising the steps of:

(a) providing proppant particles coated with a hardenable resin composition comprising furfuryl alcohol resin, furfuryl alcohol, a solvent for said resin selected from the group consisting of dipropylene glycol methyl ether, dipropylene glycol dimethyl ether, diethylene glycol methyl ether, ethylene glycol butyl ether, diethylene glycol butyl ether, dimethyl formamide, propylene carbonate, butyl acetate, furfuryl acetate, d'limonene and fatty acid methyl esters, a silane coupling agent, and a surfactant for facilitating the coating of said resin on said proppant particles and for causing said resin to flow to the contact points between adjacent resin coated proppant particles;

(b) providing a gelled liquid fracturing fluid;

(c) pumping said gelled liquid fracturing fluid into said subterranean zone to form said one or more fractures and to deposit said proppant particles therein;

(d) mixing said proppant particles coated with said hardenable resin composition with said fracturing fluid pumped in accordance with step (c) whereby said proppant particles coated with said hardenable resin composition are suspended therein;

(e) terminating steps (c) and (d) when said proppant particles coated with said hardenable resin composition have been deposited in said one or more fractures; and;

(f) allowing said hardenable resin composition on said resin composition coated proppant particles to harden by heat and consolidate said proppant particles into one or more chemical and thermal degradation resistant permeable packs.

2. The method of claim 1 wherein said furfuryl alcohol resin is present in said hardenable resin composition in an amount in the range of from about 40% to about 75% by weight of said composition.

3. The method of claim 1 wherein said furfuryl alcohol is present in said hardenable resin composition in an amount in the range of from about 1% to about 20%.

4. The method of claim 1 wherein said solvent for said resin in said hardenable resin composition is ethylene glycol butyl ether.

5. The method of claim 1 wherein said solvent for said resin is present in said hardenable resin composition in an amount in the range of from about 10 to about 40% by weight of said composition.

6. The method of claim 1 wherein said silane coupling agent in said hardenable resin composition is selected from the group consisting of N-2-(aminoethyl)-3-aminopropyltrimethoxysilane, 3-glycidoxypropyltrimethoxysilane and n-beta-(aminoethyl)-gamma-aminopropyltrimethoxysilane.

7. The method of claim 1 wherein said silane coupling agent in said hardenable resin composition is n-beta-(aminoethyl)-gamma-aminopropyl-trimethoxysilane.

8. The method of claim 1 wherein said silane coupling agent is present in said hardenable resin composition in an amount in the range of from about 0.1% to about 3% by weight of said composition.

9. The method of claim 1 which further comprises a hydrolyzable ester for breaking gelled fracturing fluid films on said proppant particles.

10. The method of claim 9 wherein said hydrolyzable ester is selected from the group consisting of a mixture of dimethylglutarate, dimethyladipate and dimethylsuccinate, sorbitol, catechol, dimethylthiolate, methyl salicylate, dimethylsuccinate and terbutylhydroperoxide.

11. The method of claim 9 wherein said hydrolyzable ester is a mixture of dimethylglutarate, dimethyladipate and dimethylsuccinate.

12. The method of claim 9 wherein said hydrolyzable ester is present in said hardenable resin composition in an amount in the range of from about 0% to about 3%.

13. The method of claim 1 wherein said surfactant for facilitating the coating of said resin on said proppant particles and for causing said resin to flow to the contact points between adjacent resin coated proppant particles in said hardenable resin composition is selected from the group consisting of an ethoxylated nonyl phenol phosphate ester, mixtures of one or more cationic surfactants and one or more non-ionic surfactants and a $C_{12}$–$C_{22}$ alkyl phosphonate surfactant.

14. The method of claim 1 wherein said surfactant for facilitating the coating of said resin on said proppant particles and for causing said resin to flow to the contact points between adjacent resin coated proppant particles in said hardenable resin composition is a $C_{12}$–$C_{22}$ alkyl phosphonate surfactant.

15. The method of claim 1 wherein said surfactant is present in said hardenable resin composition in an amount in the range of from about 1% to about 15% by weight of said composition.

16. An improved method of forming one or more fractures in a subterranean zone penetrated by a well bore and consolidating proppant particles therein, the subterranean zone having a temperature above about 200° F. comprising the steps of:

(a) providing a liquid hardenable resin composition comprised of furfuryl alcohol resin, furfuryl alcohol, an ethylene glycol butyl ether solvent for said resin, an n-beta-(aminoethyl)-gamma-aminopropyltrimethoxysilane coupling agent and a $C_{12}$–$C_{22}$ alkyl phosphate surfactant;

(b) providing a source of dry proppant particles;

(c) providing a gelled liquid fracturing fluid comprised of water and a gelling agent selected from the group consisting of guar gum, guar gum derivatives and cellulose derivatives;

(d) pumping said gelled liquid fracturing fluid into said subterranean zone to form said one or more fractures therein and to place said proppant particles therein;

(e) coating said hardenable resin composition onto said dry proppant particles conveyed from said source thereof to form hardenable resin composition coated proppant particles;

(f) mixing said hardenable resin composition coated proppant particles formed in step (e) with said fracturing fluid pumped in accordance with step (d) whereby said hardenable resin composition coated proppant particles are suspended therein;

(g) terminating steps (d), (e) and (f) when said hardenable resin composition coated proppant particles have been placed in said one or more fractures; and;

(h) allowing said hardenable resin composition on said hardenable resin composition coated proppant particles to harden by heat and consolidate said proppant particles into one or more corrosion and thermal degradation resistant permeable packs.

17. The method of claim 16 wherein said furfuryl alcohol resin is present in said hardenable resin composition in an amount in the range of from about 50% to about 65% by weight of said composition.

18. The method of claim 16 wherein said furfuryl alcohol is present in said hardenable resin composition in an amount in the range of from about 1% to about 20%.

19. The method of claim 16 wherein said solvent for said resin is present in said hardenable resin composition in an amount in the range of from about 15% to about 30% by weight of said composition.

20. The method of claim 16 wherein said silane coupling agent is present in said hardenable resin composition in an amount in the range of from about 0.5% to about 2% by weight of said composition.

21. The method of claim 16 which further comprises a hydrolyzable ester for breaking gelled fracturing fluid films on said proppant particles.

22. The method of claim 21 wherein said hydrolyzable ester is selected from the group consisting of a mixture of dimethylglutarate, dimethyladipate and dimethylsuccinate, sorbitol, catechol, dimethylthiolate, methyl salicylate, dimethylsuccinate and terbutylhydroperoxide.

23. The method of claim 21 wherein said hydrolyzable ester is a mixture of dimethylglutarate, dimethyladipate and dimethylsuccinate.

24. The method of claim 21 wherein said hydrolyzable ester is present in said hardenable resin composition in an amount in the range of from about 0% to about 3%.

25. The method of claim 16 wherein said surfactant is present in said hardenable resin composition in an amount in the range of from about 3% to about 10% by weight of said composition.

26. The method of claim 16 wherein said proppant particles are graded sand.

27. The method of claim 16 wherein said water in said gelled liquid fracturing fluid is selected from the group consisting of fresh water and salt water.

28. The method of claim 16 wherein said gelling agent is present in said fracturing fluid in an amount in the range of from about 0.2% to about 1% by weight of water therein.

29. The method of claim 16 wherein said gelled liquid fracturing fluid further comprises a cross-linking agent selected from the group consisting of alkali metal borates, borax, boric acid and compounds capable of releasing multivalent metal ions in aqueous solutions.

30. The method of claim 29 wherein said cross-linking agent is present in said fracturing fluid in an amount in the range of from about 0.2% to about 1% by weight of water therein.

31. The method of claim 16 wherein said gelled liquid fracturing fluid further comprises a delayed viscosity breaker selected from the group consisting of alkali metal and ammonium persulfates which are delayed by being encapsulated in a material which slowly releases said breaker, alkali metal chlorites, alkali metal hypochlorites and calcium hypochlorites.

32. The method of claim 31 wherein said delayed viscosity breaker is present in said fracturing fluid in an amount in the range of from about 1% to about 5% by weight of water therein.

* * * * *